US011922774B2

(12) United States Patent
Causley et al.

(10) Patent No.: US 11,922,774 B2
(45) Date of Patent: Mar. 5, 2024

(54) GAMING SYSTEM

(71) Applicant: LNW Gaming, Inc., Las Vegas, NV (US)

(72) Inventors: Peter Causley, Vaucluse (AU); David Little, Woollahra (AU)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/900,117

(22) Filed: Aug. 31, 2022

(65) Prior Publication Data

US 2022/0415133 A1 Dec. 29, 2022

Related U.S. Application Data

(63) Continuation of application No. 17/352,662, filed on Jun. 21, 2021, now Pat. No. 11,495,091, which is a continuation of application No. 16/869,580, filed on May 7, 2020, now Pat. No. 11,069,194.

(51) Int. Cl.
*G07F 17/32* (2006.01)

(52) U.S. Cl.
CPC ...... *G07F 17/3267* (2013.01); *G07F 17/3209* (2013.01); *G07F 17/3213* (2013.01); *G07F 17/3237* (2013.01); *G07F 17/3244* (2013.01)

(58) Field of Classification Search
USPC .......................................................... 463/25
See application file for complete search history.

(56) References Cited

U.S. PATENT DOCUMENTS

| | | | | |
|---|---|---|---|---|
| 2006/0121972 | A1* | 6/2006 | Walker | G07F 17/3225 463/16 |
| 2010/0120486 | A1* | 5/2010 | DeWaal | G07F 17/32 463/43 |
| 2011/0065490 | A1* | 3/2011 | Lutnick | G07F 17/3223 463/16 |
| 2019/0156620 | A1* | 5/2019 | Lutnick | A63F 13/35 |
| 2019/0188959 | A1* | 6/2019 | Lutnick | G07F 17/3225 |
| 2019/0287339 | A1* | 9/2019 | Oberberger | G07F 17/3244 |
| 2020/0134980 | A1* | 4/2020 | Lutnick | G07F 17/3276 |
| 2020/0160666 | A1* | 5/2020 | Lutnick | G07F 17/34 |

* cited by examiner

*Primary Examiner* — Pierre E Elisca

(57) ABSTRACT

A gaming system for enabling the simultaneous play of real-money, wager-based gaming and free, play-for-fun gaming is described. The gaming system is configured to deliver a fun game to a client in conjunction with a real-money gaming event and to initiate play of a fun game upon a predesignated triggering event of the real money game. The fun game is played by a plurality of players and fun game controller directs game information to a fun game server. Fun game information can be displayed for multiple players to drive competitive-type play among players and can be used to provide awards and incentivize play.

20 Claims, 6 Drawing Sheets

FIG. 3
substitutes for all except
BALANCE
$250.00
TOTAL BET
$0.25
WIN
WILD
LIGHTNING BOX

300

GAMING SYSTEM

CROSS-REFERENCE TO RELATED APPLICATIONS

This patent application is a continuation of U.S. patent application Ser. No. 17/352,662, filed on Jun. 21, 2021, which is a continuation of U.S. patent application Ser. No. 16/869,580, filed May 7, 2020, now U.S. Pat. No. 11,069, 194, each of which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, 2022, SG Gaming, Inc.

FIELD OF THE INVENTION

The present invention relates generally to gaming systems and, more particularly, to the integration of real-money, wager-based gaming and free, play-for-fun gaming.

BACKGROUND OF THE INVENTION

Wager-based gaming has been around for centuries. It is a pastime that provides entertainment and excitement for many. A prolific means of wager-based gaming comes in the form of slot games played on slot machines. Slot machines have been around for decades and originated strictly as mechanical devices. However, with the advance of technology, they were later developed into electro-mechanical and electronic devices that displayed the slot games as graphic and video images on a display screen associated with the slot machine. With further advances in technology, the graphic and video images of the slot games were enabled for download and streaming to client devices communicatively linked to servers where video slot games were stored. Wagering and play of the games could be implemented using various input and output controls on the client device.

The popularity of this type of server-based, electronic gaming both was generally preceded by various forms of online free, play-for-fun gaming, including social gaming. These forms include social casino gaming whereby slot games and other casino-type games are typically played at social gaming sites using social casino gaming applications. The substantial difference between the real-money, wager-based gaming conducted via server-client and similarly conducted social casino gaming is that with social casino gaming there is an absence of real-money wagering and a relative lack of regulatory oversight. With social casino gaming, virtual currency is wagered to only simulate the act of real-money wagering. Of course, many other forms of free, play-for-fun gaming are conducted. These include but are not limited to skill-based games, non-wagering card games, board games, word games, builder games—just about anything. The social and free-play aspect of all types of social gaming proved highly successful and led to new and expanded markets.

With the advent of electronic gaming machines and server/client-based gaming, the game designer was no longer restricted to the limitations imposed by mechanical devices or the non-networked, standalone electronic gaming machines of the past but could now develop many new and exciting features limited only by the processing power and memory of the electronic devices and the designer's creativity. Many such features have been developed and implemented to further attract players and increase playing time and many more are currently being designed and developed.

One feature that has been explored that takes advantage of the server-client architecture of developed gaming systems are associations between of real-money, wager-based gaming, and social gaming. In U.S. Pat. No. 9,011,236, a gaming system is described that enables a game outcome to be converted to a social media presentation and uploaded to a social media site. This provides the player the ability to present the game outcome on a client device communicatively linked to the social media site so that friends and family who have access to the player's social media may share in their gaming experience.

Another association between real-money, wager-based gaming social gaming is detailed in U.S. Pat. No. 9,940,787. In that patent, an enhanced payout for an online real-money, wager-based game is provided based on the results of a second game or based in part on a measure of the social gaming activity of the player. The second game need not be a wager-based game and can be related only to the social influence of the player. Upon a positive outcome of the real-money, wager-based game, the payout can be conditioned upon the results of the second game or upon the level of social activity.

It can therefore be seen that integration between the real-money, wager-based gaming markets and free, play-for-fun gaming, including social gaming, can benefit the real-money, wager-based market; namely through additional enjoyment for players, additional time spent on device, added attraction to potential new players and the ultimate expansion of markets.

SUMMARY OF THE INVENTION

The present invention relates generally to systems for integrating the play of real-money, wager-based games with games that are played without the requirement for making a wager of real value.

One aspect of the invention is a server-client network that includes at least one client device in communication with one or more servers for controlling game delivery to, and game play on, client devices. A real-money, wager-based game is selected and, concurrent with its delivery to client device for play, a fun game is provided along with software for enabling communications with a separate, predefined server for storing data associated with the play of the fun game and control software for enabling display functionality of stored data on the client device and for otherwise managing interactions between client device and separate server. Upon the occurrence of a triggering event associated with the real-money, wager-based game, the fun game is activated for play at the client device.

In yet another aspect of the invention, the fun game and accompanying separate server communication and control information is delivered by the server of the server-client network upon a triggering event and therefore not upon selection of the real-money, wager-based game.

These and other features, aspects, and advantages of the present invention will become apparent from the following detailed description and drawings, which describe and illustrate by way of example the principles of the invention.

DETAILED DESCRIPTION

Figure 1:
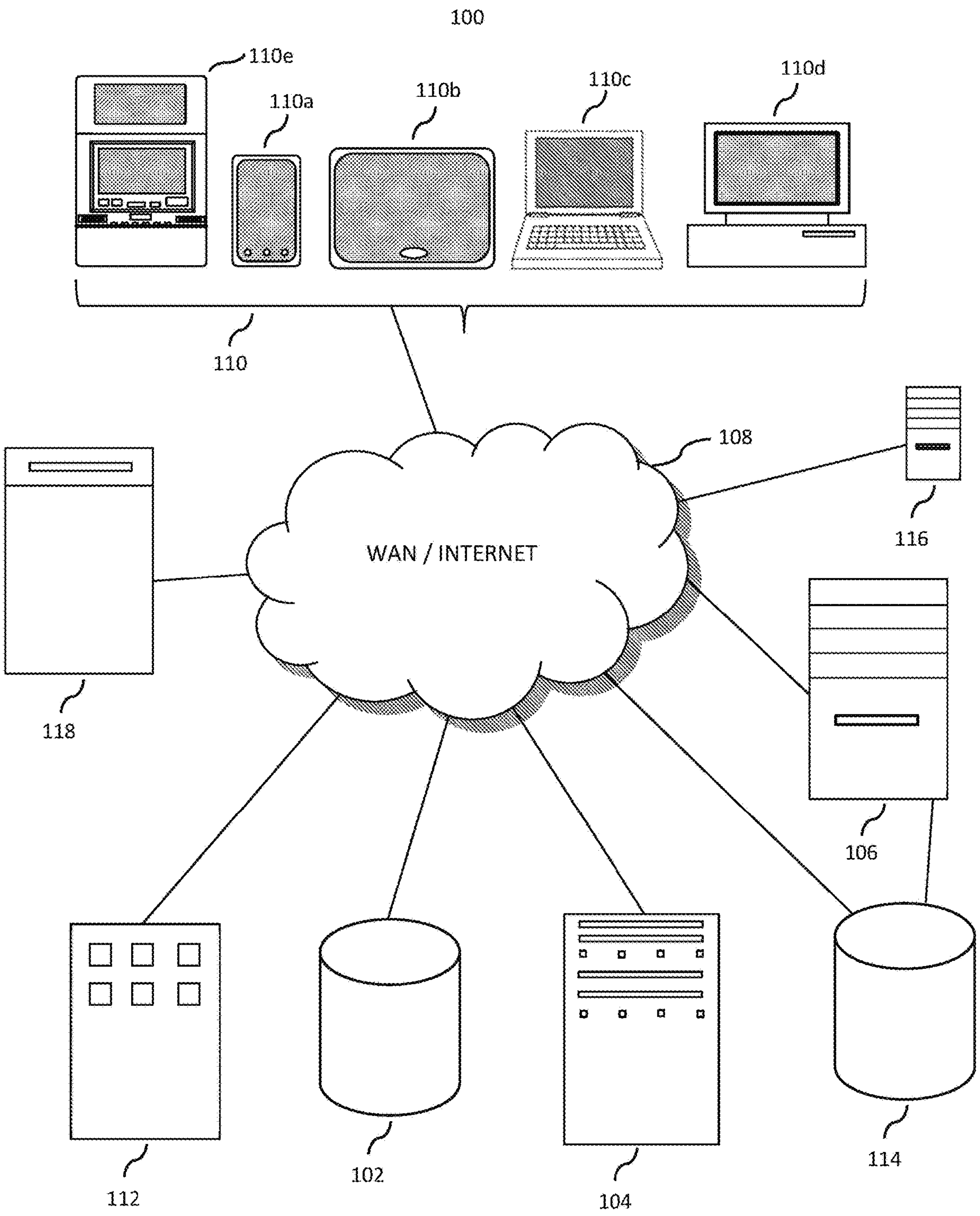
FIG. 1 shows a schematic of a typical gaming system.

In the following description, certain details existing in the prior art may be set forth in order to provide a more thorough description and understanding of the present invention. It will become apparent, however, to one skilled in the art, that the invention may be practiced without some or any of such detail and that it may also be practiced in association with other embodiments not described herein. In other instances, well-known detail may be left out from the description so as not to obscure the invention.

A gaming system communicatively coupled with computerized client devices, each controlled by a player, is herein described. The gaming system integrates real-money, wager-based gaming with free, play-for-fun gaming thereby allowing the player to conduct both within one unique gaming event. Real-money, wager-based gaming is that type of gaming which risks real money for the chance to receive a monetary return of greater value. The amount of potential monetary return is related to the amount wagered. Free, play-for-fun gaming is distinguished in that a stake is not required to play the game or, if required, is a stake having no real-world value. Any type of free, play-for-fun gaming can be used with the invention but as will become apparent, those games that provide a measure of competition between multiple players or a measure of competition against ones' self are preferred. The fun game has no bearing on the amount of win achieved by a player based on their wager and has no effect on the real-money, wager-based game nor on any aspect of the real-money, wager-based game, e.g., the percentage return to player or RTP.

In the preferred embodiment, both real-money, wager-based gaming and free, play-for-fun gaming are conducted online over the Internet. Real-money, wager-based gaming conducted through the Internet is referred to in the industry as "online real money gaming" or "online RMG" and thus the Internet-based system that employs real-money, wager-based gaming is referred to as an online RMG system. Any type of computerized device configured to communicate with the applicable servers that make up the system may be used in conjunction with the gaming system as a client device by a player for making wagers, providing gaming inputs, viewing game play, and initiating or conducting all other functions made available by the gaming system. Another embodiment of the invention may utilize land-based gaming systems whereby communications are configured between the system and immobile devices referred to as electronic gaming machines or EGMs, which are located in dedicated or semi-dedicated wager-based gaming establishments. Yet another embodiment of the invention may be a combined online RMG and land-based gaming system configured to allow for communications from EGMs as well as computerized, mobile client devices. The feasibility of such systems will become apparent, but focus will be on the preferred embodiment.

The gaming system is configured to enable the play of a real-money, wager-based game, and the play of a fun game as one unique, continuous gaming event. The gaming event is initiated through the making of a wager by a player. In one embodiment, the fun game is provided automatically at the conclusion of the real-money, wager-based portion of the gaming event. In another embodiment, the fun game is provided at some interim point in the real-money, wager-based portion of the gaming event such as at the conclusion of the base game. The base game is that part of the overall real-money, wager-based game that is apart from any feature or bonus games, which though separate from the base game are a part of the real-money, wager-based game and whose outcome is determinative in the amount of win the player accrues based on their stake. An occurrence in the base game is often-times designed to trigger a feature or bonus game, such as a pre-determined symbol combination or the occurrence of a minimum number of special symbols. But the trigger can also occur apart from the base game such as a random draw without any display indicia. In yet another embodiment, the fun game can be provided upon a pre-determined triggering event that is unique to the fun game or the same as the same triggering event which triggers a feature or bonus game. The fun game and feature or bonus game can be played separately but in sequence.

The fun game can take on many different forms, including a social casino game, a game of chance other than a social casino game, a skill-based game, or any other type of game. As previously noted, in the preferred embodiment, the fun game will have a competitive nature whereby a plurality of players will compete against one another for a best score. This adds excitement to the overall gaming event and encourages play.

FIG. 1 depicts a basic structure for a gaming system 100 that integrates real-money, wager-based gaming, and free, play-for-fun gaming. Software comprising a number of different real-money, wager-based games and at least one fun game are stored in games database 102. A typical type of real-money, wager-based game stored in games database 102 are video slot games. The game software for these games includes graphic, animation, and sound files; therefore, the content files that make up the look and feel of the games. They also include software that enables operation of the game and its respective features, and code-enabled algorithms that provide the games' mathematical definition and paytable. The fun games stored in games database 102 will be later discussed.

The software is developed for operation on a specially developed, proprietary game platform 104. A number of gaming companies have developed such platforms including Scientific Games Digital with their Open Gaming System or OGS and Microgaming with their Quickfire platform. These game platforms enable operation of the games by establishing and seeding the game outcome through use of a random number generator (RNG). The random number generator is a separate and secure software module residing on game platform 104 for randomly selecting game outcomes consistent with the applicable game algorithms. The game outcomes are thus predetermined based on the result of numbers randomly selected through the random number generator and as applied by game algorithm. Since the real money, wager-based games, gaming platform 104 and random number generator are critical to ensuring fair and honest operation of the online RMG system, they are thoroughly tested, certified, and licensed by the various regulatory bodies having authority in jurisdictions where the games residing in the games database 102 are delivered for play, as are the companies that developed the platforms.

Game platform 104 is communicatively coupled to online operator 106 through wide area network (WAN) 108 in either a wired or wireless capacity to enable electronic communications between the two modules and any of the other modules of the gaming system 100. Though only one game platform 104 is shown in FIG. 1, a number of proprietary gaming platforms can be linked to online operator 106 to provide a further assortment of games and game software. Gaming and gaming-related activities such as viewing a library of games available for play, selecting the video slot game to play, conducting electronic funds transfer (EFT), viewing game boards that show game or player statistics, or chatting with other players through an online communication portal, are initiated at online operator 106. The online operator 106 is essentially the hub of the online RMG portion of gaming system 100. It provides the aesthetics and the look and feel of a casino; albeit one that is online or virtual and lays out the communication paths via the wide area network to enable the various features and functions of gaming system 100. A number of online operators exist in the United States and elsewhere including resortscasino.com, borgatacasino.com, harrahscasino.com and many more.

Wide area network 100 facilitates communication between the servers and client devices that make up the gaming system. It is a network that enables a multitude of client devices 110 of various types to link to it for electronic communication. The Internet is a wide area network that can be used with gaming system 100 as it enables the broadest reach to players and potential players. Each online operator 106 maintains a unique uniform resource locator (URL) such as those shown above. The URL is the server-based address of the server that stores at least a part of the online operator's website domain. The URL directs a user to that server. The software that comprises the domain resides on that server and/or associated, linked servers. The software includes content files that provide the look and feel of the online operator 106; i.e., that of an online casino, and communication portals that enable access to and communication with the different modules of gaming system 100. These modules include game platform 104, client devices 110 and financial server 112. Online operator 106 also provides address information and the ability and to enable linkages between certain of these modules so that they can communicate directly with one another.

Client devices 110 include any of smartphones 110*a*, tablet devices 110*b*, laptop computers 110*c*, personal computers 110*d*, electronic gaming machines 110*e*, or any other computerized device, whether mobile or stationary, that possess the ability to receive input, deliver input, render a graphic display on a display screen, and contain all hardware and software needed to enable network-based communications over the Internet or other WAN. The client device 110 establishes a connection with online operator 106 through input of the applicable URL. This finds the domain of the online operator. A call is generated to deliver the applicable content files to client device 110 through the device's browser, whether it be any of a smartphone 110*a*, table device 110*b*, laptop computer 110*c*, personal computer 110*d*, electronic gaming machine 110*e*, or any other computerized device having the inherent capabilities for communication, display, and operation of the games. Display of the online operator website is rendered on the graphic display and audio is enabled through the speaker(s) using the graphic and audio enabling programs of client device 110. As part of the display, a list of available real-money, wager-based games are shown in a selectable list or library. A screenshot or game face of the real-money, wager-based game may be displayed with embedded hyperlink allowing its selection by clicking on the screenshot or game face using a mouse or other input device or by touching the screenshot or game face if the client device 110 incorporates capacitive touch-screen input capability.

Player database 114 records storage information for each player that registers with online operator 106. Each record contains player identification information, financial information, player tracking data and any other player-related information thought to have some value by online operator. The player identification information is at least that information necessary to know that the player is legally permitted to play the real-money, wager-based games offered through the gaming system 100 in the territory in which it is offered. The player financial information includes a secure account for storing monetary credit. The account may further include credit card information, banking information or and information for other means of electronically withdrawing and depositing monies to and from the player's account. Each account maintains such record data for one uniquely identified and registered player. The account, when holding the requisite monetary credit, provides a player with the means to make wagers on the games selected by the player for play. The amount in the player account will fluctuate based on wagers, the outcome of the real-money, wager-based games played and by deposits and withdrawals made by the player to and from the account.

Deposits and withdrawals are generally established through electronic fund transfers (EFT) to or from an external financial institution through financial server 112. Online operator 106 is the conduit between financial server 112 and player account. It facilitates the electronic handshake between the two modules to enable the necessary communications for deposits and withdrawals via electronic funds transfer. Player database 114 can also store player tracking information which can include games played, amount of time spent per game, amount of time spent per session, amount of time spent in total, amounts wagered per game, per session and in total. The online operator will likely track activity pertaining only to real-money, wager-based game play. It provides information that allows the online operator to optimize game offerings and provides data that can help target players for promotion and unique offerings. Fun game activity by individual players is also tracked. However, in the preferred embodiment, player database 114 linked to online operator 106 does not store such information; only that of real-money, wager-based game play. Fun game activity is tracked separately at the client level. This is further discussed, below.

Because online real-money, wager-based gaming is regulated by agencies having the legal authority to grant and revoke the license to operate, monitoring system 116 resides within the gaming system 100 to monitor all wager-based game play and financial transaction activity. Monitoring system 116 can be enabled to ensure the real-money, wager-based games are functioning as intended. Therefore, the monitoring system will oversee at least the real-money, wager-based game play portion of the gaming system and determine after sufficient period of play whether or not the percentage return to player (i.e., the average of the amount won for the amount wagered) is as declared by the game provider, as approved by the regulatory agency, and that the real-money, wager-based game otherwise functions as intended. The monitoring system 116 may also perform functions such as monitoring wager amounts made by players and amounts withdrawn from financial institutions. This will enable enforcement of any jurisdictional limits placed on such, help identify problem gamblers and potentially alert authorities to any attempts at money laundering. Both the monitoring system 116 and online operator 106 may further monitor player identification information from the player account of player database 114 to ensure individual players are legally permitted to play the wager-based games and will track location-based information of the actively linked client device 110 to ensure players are physically located at the time of play in a geographic location where such games may be legally played.

Security is a necessity of gaming system 100 given the financial transactions and sensitive information that is stored and accessed within. The gaming system is therefore developed and operated as a secure structure for playing an integrated real-money, wager-based and fun game. To initiate play, online operator's URL is input by a player on client device 110 through a web browser to establish a communication link between client device and the website domain of online operator 106 using well-known protocols and methods for accessing Internet-based websites (i.e., TCP/IP). Online operator 106 content is delivered to and rendered on client device 110. Player input is provided to register or, if previously registered, sign on with online operator 106. Security protocols including usernames and passwords ensure secure access to online operator 106 and the information stored within player database 114 by uniquely identified players. Player security data is stored in player database 114 and compared to entered data to enable identification of the unique player and provide access to online operator 106. The player can establish monetary credit in his uniquely associated player's account. As discussed, electronic funds transfer can occur through a credit card advance, a bank transfer, or other means for accessing and transferring player's funds, such as PayPal. A secure, communication link is established by online operator 106 to financial server 112 to enable the electronic funds transfer between player account and the external financial institution. The established funds are uniquely associated with the player as player credit and is available for use in making wagers.

The player selects a game for play from a list of selectable real-money, wager-based games which, as previously discussed, can be displayed in a rudimentary, selectable fashion on online operator website. Upon selection, online operator 106 signals game controller 202 (shown in FIG. 2) residing within game platform 104 to download and stream aspects of the applicable game software accessed to client device 110. Delivery of the real-money, wager-based game is delivered to the network-based address of client device 110. The client device address is provided identified by online provider 106 upon establishment of the communication link established when client device 110 established a connection with online operator. Online operator 106 then shares that information with game controller to enable the directed delivery to client device 110. The game controller 202 accesses games database 102 to direct delivery of the copied game software to client device 110. Certain aspects of the real-money, wager-based game generated or requiring storage on game platform 104, such as the game outcome seed generated by the random number generator, are streamed to client device 110 from game platform 104 while other aspects, such as graphic, video and audio files pertaining to the content or look and feel of the game, are downloaded to a memory component of client device. Information is input by player at client device 110 to control aspects of game play. Such input for a real-money, wager-based video slot game includes a selection of paylines, designated credit denomination, a number of credits to be wagered per payline, initiation of game play, and any other input optional to (e.g., speed of the game, sound level), or required by, respective features of the real-money, wager-based game. Input is provided through any of a computer mouse, keyboard, capacitive touchscreen, or any other means for providing input from a client device 110. The input indicia are displayed on the display screen of client device 110 in accordance with the programming instructions of the game software. Communications pertaining to financial activity are initiated at client device 110 and communicated to online operator 106. Online operator 106 facilitates the financial transaction which includes the staking of a wager on the real-money, wager-based game while contemporaneously deducting corresponding amounts from player's account. As previously discussed, additional financial transactions such as acquiring funds from or depositing funds to external financial institution 112 are also initiated at client device 110. At the conclusion of the game, online operator 106 credits player's account with any amounts won as a result of a winning game outcome. New, adjusted amounts are displayed, accordingly, in the graphic display of client device 110.

The player elects to initiate play of the real-money, wager-based game through input at client device 110. A signal is sent to game controller 202 to have game platform XXX seed client device with the game outcome. The random number generator is activated to provide the seed. Display of the game in operation and at outcome is thereafter rendered on the display screen of client device 110. Online operator 106 monitors game activity and player's account is adjusted for positive outcomes of the real-money, wager-based game. Adjusted amounts are communicated to and newly displayed on the graphic display of client device 110 as available credit.

In one embodiment of the invention, the fun game software is delivered to client device 110 from game platform 104 concurrent with delivery of the real-money, wager-based game software. Therefore, the downloadable aspects the fun game and real-money, wager-based game software are simultaneously delivered to client device 110 upon selection of the real-money, wager-based game. In this embodiment, the fun game is pre-associated with the real-money, wager-based game or is randomly selected from a plurality of available fun games. Additionally, in this embodiment, after delivery the fun game software resides entirely on client device 110 and no further downloads or streams are made. Thus, the fun game is not controlled by game controller 202. All control of the fun game is performed at client device 110 using a fun game controller, which can be a software module for controlling aspects of the game and related activities.

Figure 2:
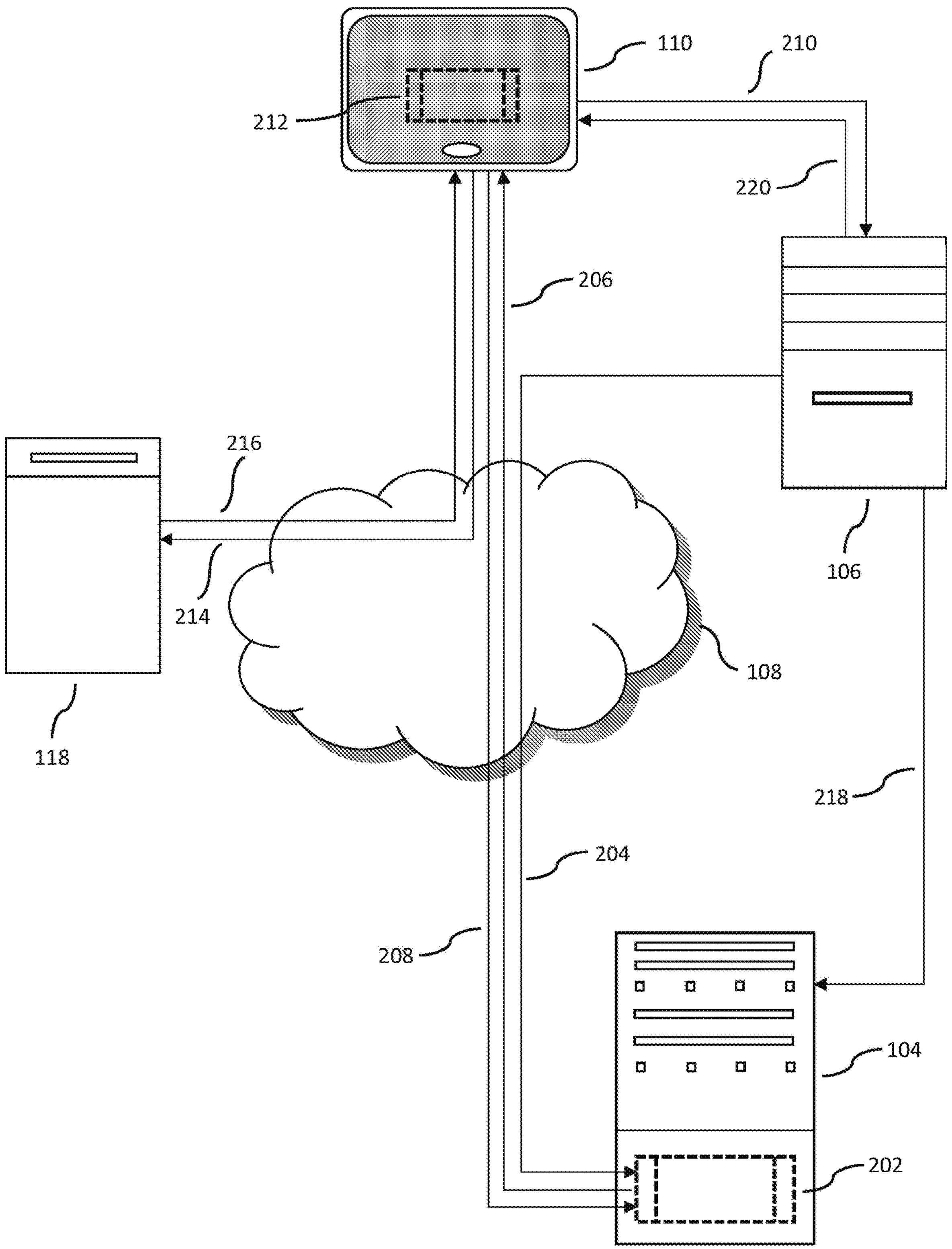
FIG. 2 shows a schematic of communication flow.

Referring to FIG. 2, game controller 202 is shown embodied within game platform 104. Game controller 202 is configured to deliver both the real-money, wager-based game, and fun game during a single initiated game delivery event. The download occurs upon receipt of signal through communications link 204 from online operator 106 through wide area network 108. Game controller 202 delivers the games through communications link 206 to client device 110 through network 108; the client address having been shared with game controller by online operator 106. In this embodiment, all communications transpire through wide area network 108. However, in alternative embodiments, certain modules can be directly linked such that they share communications amongst themselves apart from the network link. Client device 110 sends input to game controller 202 through communication link 208 to initiate real-money, wager-based game play. This activates the random number generator on game platform 104 to generate outcome and communicates information back to client device 110 through communication link 206 to initiate display of the real-money, wager-based game play and its outcome on the graphic display of client device 110. Delivery of information associated with the wager, the results of wager, and game play is sent through communication link 210 to online operator 106 for storage as data in player database 114. As a precursor to the above-described activities, available player credit information was established. This information is held in player's account in player database associated with online operator. Therefore, online operator could communicate this information to either or both game platform 104 through communication link 218 for relay to client device 110 or direct from online operator 106 to client device through communication link 220. As further shown in FIG. 2, fun game controller 212 is embodied within client device 110. It is this device that controls aspects of the fun game. It is downloaded to client device with delivery of the fun game software through communication link 206. Since most client devices used with gaming system 100 are not dedicated to gaming system, fun game controller is not included as a software module or hardware device. Therefore, fun game controller 212 must be downloaded to client device 110 as a software module along with the game software load. Control of the fun game occurs all within client device 110. This is further described, below.

Figure 3:
FIG. 3 displays a video slot game.

In one embodiment, gaming system 100 employs a video slot game as the real-money, wager-based game portion of the system. FIG. 3(*a*) displays a typical video slot game capable of being played on online operator website. As is well-known in the art, the video slot game 300 includes rows and columns and a plurality of symbols. A subset of symbols is randomly displayed within the rows and columns as determined by game software in conjunction with the output generated by the random number generator. Winning outcomes are displayed by designated symbol combinations along paylines, other designated symbol combinations, or the occurrence of a predetermined number of pre-designated symbols within any or pre-designated positions of the row-column-defined matrix. In accordance with one embodiment of the invention, a triggering condition of the real-money, wager-based game also triggers the fun game of the gaming system 100. Referring again to FIG. 2, upon the occurrence of a pre-programmed triggering condition, a signal is initiated and sent by programming of the real-money, wager-based game software to fun game controller 212 to initiate play of the fun game on client device 110. The triggering condition can include any of the types of winning combinations described, above. Alternatively, it can occur randomly without regard to symbol outcome. It can also occur at the conclusion of the real money, wager-based game regardless of outcome, or at the conclusion of a segment of the real-money, wager-based game such as the base game, i.e., the primary portion of the game prior to the play of any feature extensions or bonus games. Therefore, the type of triggering condition is unlimited and can occur as a result of any randomly occurring event or as a result of an always-occurring event.

Figure 4:
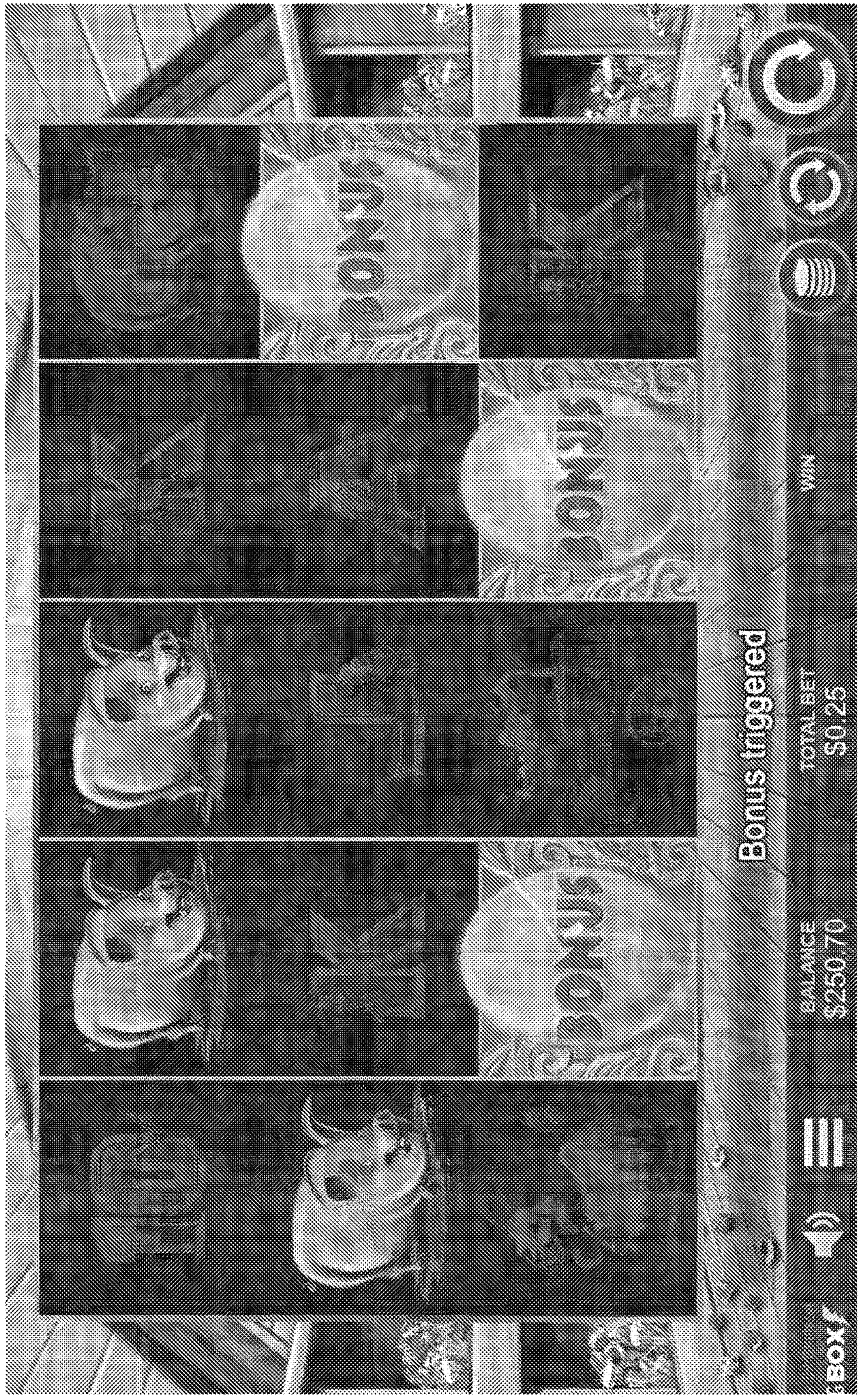
FIG. 4 displays a trigger condition in a video slot game.

FIG. 4 displays a triggering condition in the described embodiment. In this embodiment, at least three "bonus egg" symbols at any position within the game matrix trigger a fun game. The fun game is a fun, entertaining game that adds excitement to the real-money, wager-based game. It has no effect on the monetary return to the player (RTP) and no effect on outcome but adds to the excitement and creates an additional desire to play. In addition to providing the fun game, the triggering condition can also trigger an event in conjunction with the real-money, wager-based game. This can include the disbursement of a monetary payout, the introduction of a real-money feature or bonus game, including a number of free spins, whereby the player can win amounts based on their wager and the outcome of the feature game, bonus game or free spins. In the described embodiment, the described trigger in the real-money, wager-based game doubles as a trigger for a fun game and as a trigger for a number of free spins which provide a chance to achieve real money, winning outcomes.

In another embodiment of gaming system 100, the fun game is delivered to client device 110 after the occurrence of the triggering event. The fun game controller 212 signals the game controller 202 to look up the fun game within games database 104 and deliver it to client device 110. As with the previous embodiment, game controller 202 delivers the fun game to client device 110 through communications link 206. Also similar to the previous embodiment, the fun game could be the only fun game within the games database 104, in which case it would be the fun game selected by the game controller for delivery to client device 110. However, if multiple fun games reside in the games database 104, the fun game can be randomly selected or it can be associated with the particular real-money, wager-based game. This is determined through the software programming of the fun game and fun game controller. Unlike the previously described embodiment, the fun game can also be associated with the trigger condition that initiated the fun game event. Therefore, it could also be selected based on criteria such as the particular triggering event that caused the trigger, the wager amount, player profile data, in relation to the particular online operator through which the game is being played or in relation to the proprietary game platform through which the games are deployed. The electronic communication received from fun game controller 212 would identify the fun game for selection based on the applicable criteria. It should be mentioned that all of these embodiments could occur in the prior embodiments whereby the real-money, wager-based game and fun game are delivered during one download sequence. But it would not be practical since numerous fun games would then need to be delivered thereby taxing the memory and operating limits of client device 110.

Figure 5:
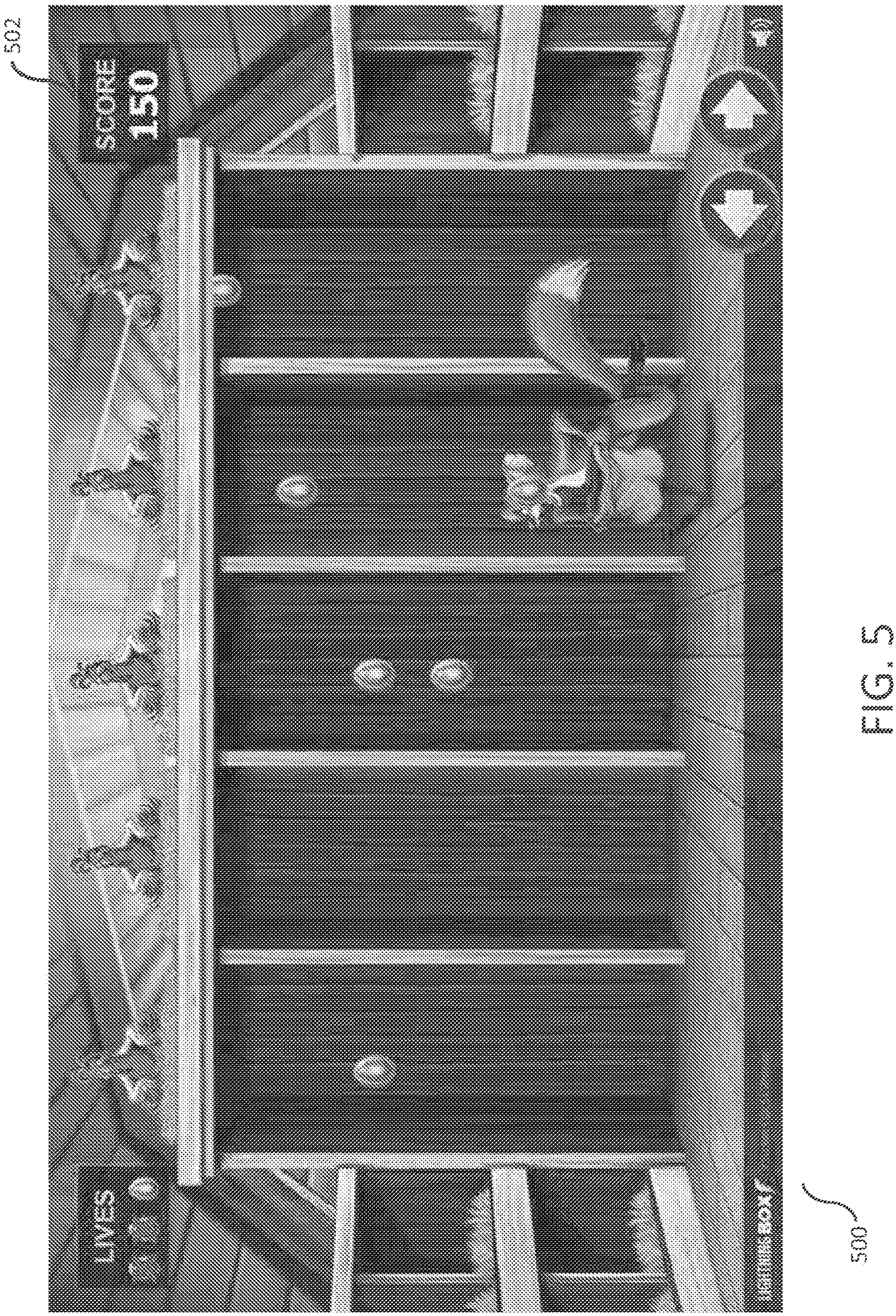
FIG. 5 displays a fun game.
Figure 6:
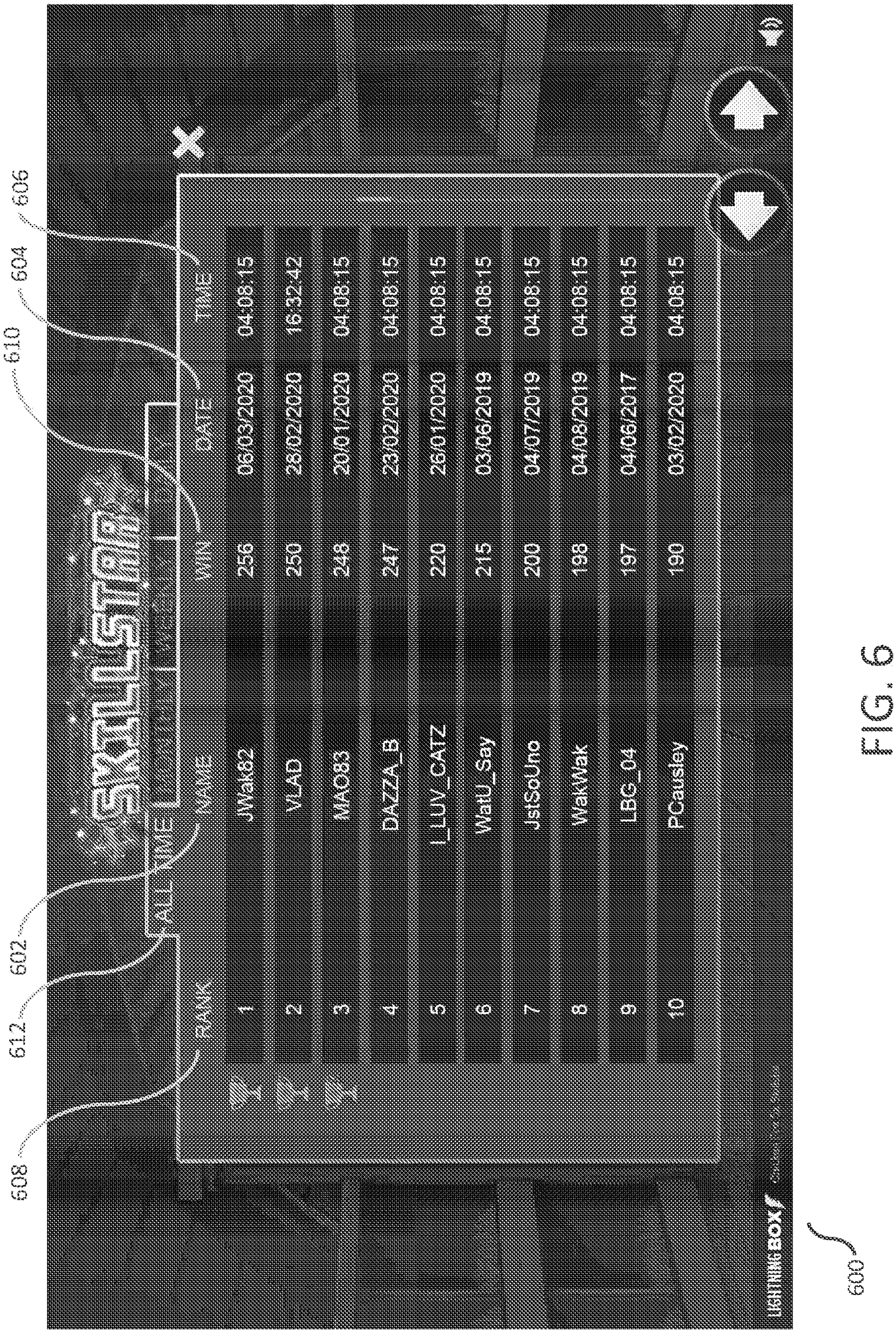
FIG. 6 displays a leaderboard for a fun game.

Input by the player during operation of the fun game is conducted through the same input controls described for use in providing input for the real-money, wager-based game. The input will depend on the type of fun game provided to the player for play. In the present embodiment, the fun game is a skill-based, competitive game whereby players may compete against each other for a best score. FIG. 5 shows a fun game 500 that can be used in association with the gaming system. In this game, a player provides input to move the fox character horizontally in order to catch eggs dropping from chicken characters nesting on an overhang, above. The object is to collect as many of the eggs as a player can without allowing any to drop to the floor. Once a predetermined number of eggs drop to the floor, or a certain amount of time has elapsed, the fun game concludes. A score is tallied 502. This is merely an example of a fun game that provides a competitive aspect to it. Any type of fun game can be used in with the invention. However, in the preferred embodiment, the fun game is competitive in nature to allow individual players to challenge themselves by playing for a best score and to allow a plurality of players to compete against each other for best score. This adds a layer of excitement to the gaming system.

Referring back to FIG. 1 and FIG. 2, fun game server 118 is provided to store information associated with player activity from play of the fun game. The fun game information is sent to the fun game server 118 by fun game controller 212 along communication link 214 for storage in server memory. Information sent includes player identification information (e.g., player name or pseudonym or generated identification if the player elects to remain anonymous) and fun game scores where it is stored on the fun game server 118 as per player record data. Additional information can be sent and stored such as geographic location, play history, and more.

Fun game server 118 possesses a unique Internet URL and therefore its own website address. Software residing on the fun game server communicates with fun game controller 212 per communication link 216 to enable the accumulation of player record data and to display on client devices the accumulated player record data. FIG. 5 depicts a leaderboard 600 which displays the results of individual player activity 602. The programming of the fun game server 118 maintains a real-time score of individual players and lists a number of best scores. In the embodiment shown, the top 10 ranked player scores are listed. Other game play criteria may be listed such as the date the fun game was played 604, the time of play 606, ranking 608, and the tallied score 610. Additionally, the best fun game results may be listed for one or more set periods of time such as daily, weekly, monthly, and all-time 612. The address of the fun game server can be called by players from player device to view the results of player activity and to see if player's score has attained one of the listed, top scores. Though a set number of player scores are displayed, the software application can provide an ability to scroll or otherwise display additional player scores. The software can also be programmed to notify a player of their rank drops such that their best score is no longer posted for public view.

The fun game controller 212 can automatically have fun game server 118 called at the conclusion of the fun game to have the leaderboard 6000 displayed on client device 110. Additionally, the game program may include the ability to input a request to deliver leaderboard content to client device 110. Other information can be displayed within or adjacent the leaderboard such as advertisements, messaging, or a view of current activity by other players.

The competitive nature of the fun game in the present, preferred embodiment is apparent. In jurisdictions where legal, the fun game can take the form of a sweepstakes. Prizes can be awarded to players based on best scores within a given time period such as daily, weekly, monthly, or annually. Alternatively, sweepstakes entry tickets can be provided to a number of players having the best tallied scores or to all or some players depending on best scores or cumulative scores. Numerous scenarios for providing entries into a sweepstakes can be envisioned and coordinated with the play activity and/or results of the fun game. The fun game server 118 can be separately monitored to ensure compliance with jurisdictional rules and requirements.

The fun game can also take place within the framework of social gaming or, preferably, social casino gaming. These applications allow players to play various games within a platform designed for such. Both use virtual currency to "purchase" items (in the case of the latter, the items are "wagers"). With social casino gaming, virtual currency is used as opposed to real money as the basis for making wagers. Virtual currency holds no real value, and its only use is for making wagers on social casino games or purchasing items within non-casino-based social gaming. Additionally, the virtual currency only has use within a given social gaming or social casino gaming application. Therefore, virtual currency held by a player in one application generally cannot be used within another application. Virtual currency is also referred to as virtual coin or virtual credit. When a fun game of the present invention is played within the setting of social gaming or social casino gaming, the fun game server would then be the server wherein the social gaming application that offers the games resides. The player would register with or have been previously registered with the application in order to play games within it. The player would be able to enjoy all of the offerings provided by the social gaming application. The present invention would be a means of driving players to the social gaming or social casino gaming application for play of not only the fun game provided under the gaming system, but other social or social casino games additionally included with the application. Social gaming applications derive their revenues through advertisement and the purchase of virtual currency by players. Thus, driving additional players to social gaming and social casino gaming applications through the present gaming system would provide benefit. Under such an embodiment, fun game controller 212 links player to the fun game provided under the gaming system 600 through establishment of a connection to the social gaming or social casino gaming application at fun game server 118 and directing the player to the fun game. A token amount of virtual currency can be provided each time the player triggers the fun game and added to a player's virtual currency account within the application to ensure the ability to play the social game and to further incentivize play of the gaming system.

In a land-based gaming system, the aspects of the invention can be contained within a single EGM. Though not shown in the figures, the fun game can be embedded within the game software included with that EGM. Individual players are identified through player tracking systems communicatively linked to the EGM or input by the player at the EGM and, when a fun game triggers, their scores are tallied and accessibly stored in relation to their identification information. Thus, each player having played on that particular EGM that also played the fun game would have stored information linked to their identification information. This could reside solely on the EGM, itself, or included as record data in the player tracking system. Similar to the other gaming system described, programming specific to that EGM could read and display fun game score information, associated identification information and other information in a variety of ways. Players playing at that machine would be able to play the fun game as part of the experience of playing the real-money, wager-based game at that EGM and could also enjoy the experience of seeking to achieve their own best score and seeking to achieve a best score among a plurality of players that played at that EGM.

In yet another embodiment of the invention, though real-money, wager-based gaming has been discussed thus far in conjunction with free, play-for-fun gaming, a gaming system that includes two types of fun games. This embodiment would be preferred in association with social casino gaming being the one type of fun game played in lieu of a real-money, wager-based game. The social casino game, as described, above, would use virtual currency. The gaming system would similarly function; the primary similarity being that the other fun game would be triggered through play of the social casino game and only that second fun game would involve tallying of scores and a link of those scores to an identified player. This type of system would not involve some of the security and regulatory oversight aspects of the prior embodiments but would similarly function with respect to the use of a fun game to add to and increase the function of a primary game mode.

It should be understood that the above-described arrangements of the system and methods are merely illustrative of applications of the principles of this invention and many other embodiments and modifications may be made without departing from the spirit and scope of the invention as defined in the claims.

What is claimed is:

1. A gaming system integrating the play of a real-money, wager-based game with at least one fun game comprising:
- a client device having a display screen and a processor;
- a game server communicatively coupled to the client device, the game server having a memory storage device for storing software associated with a real-money, wager-based game and the at least one fun game;
- a player database having a credit account communicatively coupled to the client device for storing monetary credit;
- wherein, in response to the player making a wager drawn from the stored monetary credit on the real money, wager-based game, the processor is configured to execute the software to:
- display on the display screen the real-money, wager-based game; and
- display on the display screen the at least one fun game in response to completion of at least some portion of the real-money, wager-based game.

2. The gaming system of claim 1, wherein the at least one fun game comprises one of a social casino game, a game of chance other than a social casino game, or a skill-based game.

3. The gaming system of claim 1, wherein the completion of at least some portion of the real-money, wager-based game comprises completion of a base game portion of the real-money, wager-based game.

4. The gaming system of claim 1, wherein the software associated with the at least one fun game is transmitted to the client device in response to a trigger condition.

5. The gaming system of claim 4, wherein the at least one fun game includes a first fun game and a second fun game, and wherein the software associated with the first fun game is transmitted to the client device in response to a first trigger condition and the software associated with the second fun game is transmitted to the client device in response to a second trigger condition.

6. The gaming system of claim 4, wherein the client device is configured to display a feature game on the display screen in series with the fun game in response to the trigger condition.

7. The gaming system of claim 1, wherein the game server is configured to transmit the software associated with the real-money, wager-based game and the fun game to the client device together, the fun game pre-associated with the real-money, wager-based game.

8. A gaming system comprising:
- a game server communicatively coupled to a client device of a player, the client device including a display screen and a processor, wherein the game server includes a memory storage device for storing software associated with a real-money, wager-based game and at least one fun game, the game server configured to transmit the software of the real money, wager-based game and the at least one fun game to the client device;
- wherein, upon the player making a wager on the real money, wager-based game, the processor is configured to execute the software to:
- display on the display screen the real-money, wager-based game; and
- display on the display screen the fun game in response to completion of at least some portion of the real-money, wager-based game.

9. The gaming system of claim 8, wherein the completion of at least some portion of the real-money, wager-based game comprises completion of a base game portion of the real-money, wager-based game.

10. The gaming system of claim 8, wherein the wager is drawn from a credit account stored in a database communicatively coupled to the client device.

11. The gaming system of claim 8, wherein the software associated with the at least one fun game is transmitted to the client device in response to a trigger condition.

12. The gaming system of claim 11, wherein the at least one fun game includes a first fun game and a second fun game, and wherein the software associated with the first fun game is transmitted to the client device in response to a first trigger condition and the software associated with the second fun game is transmitted to the client device in response to a second trigger condition.

13. The gaming system of claim 8, wherein the game server is configured to transmit the software associated with the real-money, wager-based game and the fun game to the client device together, the fun game pre-associated with the real-money, wager-based game.

14. The gaming system of claim 8, wherein the at least one fun game comprises one of a social casino game, a game of chance other than a social casino game, or a skill-based game.

15. A method of conducting and presenting games using a gaming system, the gaming system including a client device and a game server configured to store software associated with a real-money, wager-based game and at least one fun game, the method comprising:
- transmitting, by the game server, the software of the real money, wager-based game and the at least one fun game to the client device;
- in response to a wager placed on the real-money, wager-based game, executing, by the client device, the software of the real money, wager-based game to cause the client device to perform the steps of:
- displaying on a display screen of the client device the real-money, wager-based game; and
- displaying on the display screen the at least one fun game in response to completion of at least some portion of the real-money, wager-based game.

16. The method of claim 15, wherein the at least one fun game comprises one of a social casino game, a game of chance other than a social casino game, or a skill-based game.

17. The method of claim 15, wherein the completion of at least some portion of the real-money, wager-based game comprises completion of a base game portion of the real-money, wager-based game.

18. The method of claim 15, wherein the software associated with the fun game is transmitted to the client device in response to a trigger condition.

19. The method of claim 18, wherein the game server stores software associated with a first fun game and a second fun game, and wherein the software associated with the first fun game is transmitted to the client device in response to a first trigger condition and the software associated with the second fun game is transmitted to the client device in response to a second trigger condition.

20. The method of claim 15, wherein the game server is configured to transmit the software associated with the real-money, wager-based game and the fun game to the client device together, the fun game pre-associated with the real-money, wager-based game.

* * * * *